O. CULLMAN.
ROUTE GUIDE.
APPLICATION FILED AUG. 10, 1908.
965,159.
Patented July 26, 1910.
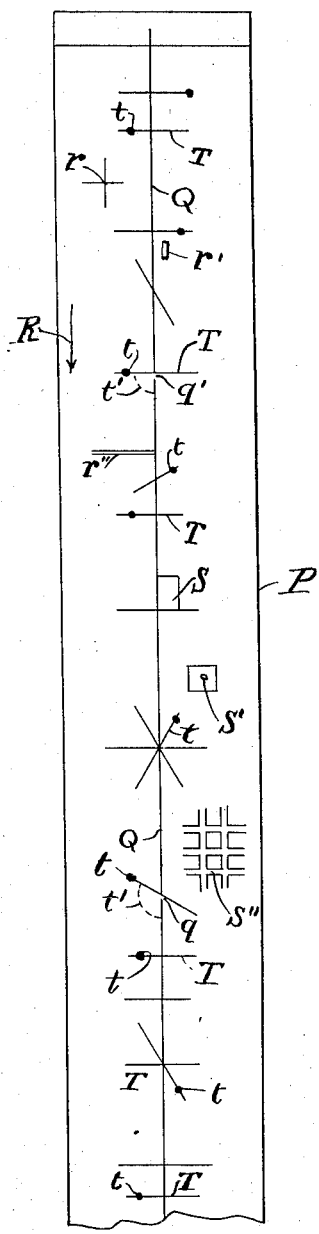
Witnesses:
C. A. Adams.
E. F. Brown
Inventor:
Otto Cullman,
By Charles Turner Brown,
Atty.

UNITED STATES PATENT OFFICE.

OTTO CULLMAN, OF CHICAGO, ILLINOIS.

ROUTE-GUIDE.

965,159.

Specification of Letters Patent.   Patented July 26, 1910.

Application filed August 10, 1908.   Serial No. 447,819.

*To all whom it may concern:*

Be it known that I, OTTO CULLMAN, a citizen of the United States, and a resident of Chicago, in the county of Cook and State of Illinois, have invented certain new and useful Improvements in Route-Guides, of which the following, when taken in connection with the drawing accompanying and forming a part hereof, is a full and complete description sufficient to enable those familiar with the art to which it pertains to understand, make, and use the same.

This invention relates to a route guide for travelers in wheeled vehicles which are provided with mechanism designed to move said guide distances corresponding with the distances traveled by said vehicles. And the object of the invention is to obtain a route guide, by means of which a person traveling in a wheeled vehicle, over a route not previously traveled by such person, may, with certainty, follow the correct route laid out by said guide.

A further object of the invention is to obtain a route guide which will not require a skilled person, or one familiar with the use of maps, to read or understand it.

A further object of the invention is to obtain a route guide of the kind named, which will be compact, simple in construction, durable and easily manipulated.

A further object of the invention is to obtain a route guide on which the total length of the route designated thereby will be indicated by a scaled line, either broken or unbroken, extending longitudinally of said route guide, while at the same time, the actual relation of the road or roads forming an element, or elements, in the route to the road or roads crossing, intersecting, or branching therefrom will be shown on the route guide and represented to the person using the device as the same actually appear to such person when the vehicle is positioned on the route and has traveled to such crossing, intersecting, or branch road.

Other results are obtained by me, as will be observed from the description and illustration herein of a device embodying the invention.

In the drawing referred to a portion of a route guide as it appears when constructed in accordance with these improvements is shown.

A reference letter applied to designate a given mark is used to indicate said mark throughout the figure wherever the same appears.

P is a ribbon, of cloth, paper, or other flexible material which may be wound around the hubs of spools provided therefor in the mechanisms arranged to use the device.

Q is a straight line on the ribbon P. Line Q may be continuous or broken. I have shown said line Q broken at $q$, $q'$, respectively, and such break indicates that the road on which the vehicle using the device stands, does not continue, but is merged in branches, when the vehicle is traveling in the direction indicated by the arrow R.

$r$ indicates a church, $r'$ a bridge, $r''$ a railroad, S a block of buildings, S' a school house, and S'' a village. Other marks may be placed on the ribbon P, to indicate other objects, and the marks used by me to indicate the above recited objects are arbitrary and may be changed.

T indicates a turn of the road, and the dots (some of which are lettered $t$, $t$,) respectively, indicate the one of the turns shown, into which the vehicle is to be guided to travel the route designated by the device, that is, the total length of the route, including turns as well as the length of the roads in any direction, is represented by the length of line Q. The several turns T, T, are drawn to a scale, that is, the distance from the beginning of the route to said turns is at all times the scaled distance corresponding with the actual distance necessary to travel from said beginning of the route, to arrive at said turns. When the vehicle is run over the course indicated by the line Q the position of the vehicle prior to making a designated turn will be at all times indicated on said ribbon, as will also the objects adjacent to the place where the vehicle is positioned in apparent relation to the observer corresponding with the actual view of said objects from the vehicle, so that the driver is informed by inspection of the route guide that it is necessary to turn from the road on which the vehicle is positioned to the road indicated as intersecting, crossing, or branching therefrom.

Immediately after making a given turn the vehicle is, suppositiously, still upon the straight line Q, and thereafter all objects, turns of the road to maintain the route, and other information indicated on the device will bear apparent relation to said line corresponding to the actual relation thereof to the road on which the vehicle is traveling; and by the use of suitable mechanism to automatically move the device a scaled distance corresponding with the actual distance traveled the position of the vehicle on the route will at all times when the vehicle arrives adjacent to an object or turn be substantially the same as the position of the vehicle to the said objects, turns and other things marked or indicated by marks.

Having thus described my invention, what I claim as new and desire to secure by Letters Patent is,—

As a new article of manufacture, a route guide consisting of a ribbon of flexible material provided with a straight line arranged longitudinally thereon and representing the total length of the turns and roads of the route irrespective of the course of said roads, and made to a scale, and provided with additional lines representing additional roads and respectively arranged relative to the first named line to present to the view of a person positioned on the route the actual relations of the several roads represented, and also provided with additional marks arranged, when a turn is to be made, to designate the line which represents the road forming an element of said route.

OTTO CULLMAN.

In the presence of—
EDWARD J. BROWN,
CHARLES TURNER BROWN.